US007519129B2

United States Patent
Porter et al.

(10) Patent No.: US 7,519,129 B2
(45) Date of Patent: Apr. 14, 2009

(54) PRECODING OF CONTENTION WORDS IN A FIXED WIRELESS ACCESS SYSTEM

(75) Inventors: John David Porter, Cambridge (GB); Stephen David Greaves, Cambridge (GB); Malcolm Paul Sellars, Ely (GB)

(73) Assignee: Cambridge Broadband Networks Limited, Cambridge (GB)

( * ) Notice: Subject to any disclaimer, the term of this patent is extended or adjusted under 35 U.S.C. 154(b) by 682 days.

(21) Appl. No.: 10/538,561

(22) PCT Filed: Nov. 12, 2002

(86) PCT No.: PCT/GB03/05039

§ 371 (c)(1),
(2), (4) Date: Nov. 23, 2005

(87) PCT Pub. No.: WO2004/054192

PCT Pub. Date: Jun. 24, 2004

(65) Prior Publication Data

US 2006/0148428 A1    Jul. 6, 2006

(30) Foreign Application Priority Data

Dec. 12, 2002  (GB) .................................. 0229065.8

(51) Int. Cl.
*H04B 15/00* (2006.01)
*H04B 1/04* (2006.01)
*H04K 1/02* (2006.01)

(52) U.S. Cl. ........................ 375/285; 375/219; 375/295; 375/296; 375/316; 375/346; 455/114.2; 455/114.3; 455/63.1; 332/107; 332/159; 332/160; 370/338

(58) Field of Classification Search ................. 375/141, 375/285, 295–296, 316, 346; 455/63.1, 114.2–114.3; 370/338; 332/159–160, 162; 329/319–320, 329/349
See application file for complete search history.

(56) References Cited

U.S. PATENT DOCUMENTS

| 5,881,363 | A  | * | 3/1999  | Ghosh et al. ................. 455/5.1 |
| 7,155,165 | B1 | * | 12/2006 | Kowalewki .................. 455/65 |
| 7,197,084 | B2 | * | 3/2007  | Ketchum et al. ............ 375/296 |

FOREIGN PATENT DOCUMENTS

| GB | 2 373 420   | 9/2002  |
| GB | 2 376 381   | 12/2002 |
| GB | 2 376 391   | 12/2002 |
| GB | 2 378 103   | 1/2003  |
| GB | 2 384 666   | 7/2003  |
| GB | 2 396 277   | 6/2004  |
| WO | WO03/013087 | 2/2003  |

OTHER PUBLICATIONS

Sellars, M.P., et al., "Word-specific precoding of contention bursts for broadband wireless networks", *Electronic Letters, IEE Stevenage*, 39(7):624-625, Apr. 2003.

* cited by examiner

*Primary Examiner*—Tesfaldet Bocure
*Assistant Examiner*—Sophia Vlahos
(74) *Attorney, Agent, or Firm*—Fish & Richardson P.C.

(57) ABSTRACT

A fixed wireless access communications system comprises an access point and a plurality of subscriber units. Each subscriber unit (502) contends for access to a communications channel to the access point by transmitting a contention word to the access point during a contention time slot. The contention word is predistorted to compensate for the channel impulse response of the transmission channel so that the access point can decode the contention words without using equalisation. A control unit (512), which may comprise a microprocessor, loads the predistorted contention word (a) into a memory (520) and causes the stored predistorted contention word (a) to be applied to a transmitter (508) during a contention time slot when the subscriber unit (502) wishes to request a transmission channel to transmit data to the access point.

28 Claims, 7 Drawing Sheets

PRIOR ART

PRECODING OF CONTENTION WORDS IN A FIXED WIRELESS ACCESS SYSTEM

CROSS-REFERENCE TO RELATED APPLICATIONS

This application is a 371 application of and claims priority to International Patent Application Serial No. PCT/GB2003/005039, filed Nov. 19, 2003, which claims priority to United Kingdom Patent Application Serial No. 0229065.8, filed Dec. 12, 2002. The disclosures of the prior applications are considered part of and are incorporated by reference in the disclosure of this application.

The invention relates to a fixed wireless access communications system comprising an access point and a plurality of subscriber units. The invention further relates to an access point and a subscriber unit for use in such a system. The invention still further relates to a method of communication in such a system.

Broadband wireless channels suffer from multipath propagation, which causes intersymbol interference (ISI) at high data rates. For Fixed Wireless Access (FWA) systems and wireless LAN's such as HIPERLAN, the line-of-sight (LOS) path between transmitter and receiver may be obstructed, causing severe multipath propagation, with nulls in the channel frequency response. Typically for single-carrier systems, an equalizer is used at each end of the link to remove ISI from the received signal. In point-to-multipoint (PMP) networks such as FWA, a number of terminals or subscriber units (SU's) communicate with a single node or access point (AP).

On the downlink, each SU only receives data from a single AP, and so its equaliser only has to deal with a single channel impulse response. Furthermore, each SU can receive broadcast transmissions sent to all other SU's from the AP, and thus there is plenty of training data and sufficient time to train the equaliser at the SU. On the uplink, the AP must be able to receive data bursts from many SU's in quick succession, each burst arriving over a different multipath channel. The AP must therefore rapidly re-train its equaliser for each burst from a different SU, and this requires intensive processing, as well as large overheads for training symbols and training delay. "Warm start-up" avoids re-training by storing a set of equaliser coefficients corresponding to each SU in a look-up table at the AP. When a burst from a particular SU is scheduled to arrive at the AP, the equaliser co-efficients are loaded into the equaliser from the look-up table, so that the data burst can by decoded without re-training.

A difficulty arises with random-access timeslots, during which any SU may randomly request channel access by sending an access request (contention burst) to the AP. This request mechanism is based on slotted ALOHA. A contention burst received collision-free at the AP is recognised as a valid access request, and the AP then allocates upstream data capacity to the requesting SU. During these random-access slots, the AP has no way of knowing beforehand which SU is sending the contention burst, and therefore cannot use equaliser coefficients from a look-up table. Furthermore, contention bursts are typically very short and require fast turnaround at the AP. This means that there is very little time available to re-train the equaliser at the AP, and only limited training data. It has been shown that multipath interference greatly degrades the efficiency of random access protocols such as ALOHA.

One solution to the problem is for each SU to precode its contention burst before transmission, so that it arrives at the AP undistorted. Unfortunately, many preceding schemes are not suitable for broadband wireless channels which have nulls in their frequency response. Linear equalisers cannot easily deal with such channels because noise enhancement occurs at nulls in the frequency domain and linear precoders have the same problems. Non-linear precoders avoid noise enhancement at the nulls, but are prone to instability when the channel is not minimum-phase, and some form of limiting operation is needed to keep the precoder stable. The drawback with non-linear precoders is the extra processing needed at the receiver to undo the effects of the transmitter stabilisation operation.

Precoders described in the literature typically use a filter (or combination of filters) to invert the channel impulse response so that any transmitted signal, after preceding and passing through the channel, is received undistorted at the receiver. The precoder transfer function F is the inverse of the channel transfer function H, so that FH=1. All roots of the channel impulse response (CIR) must be cancelled by corresponding roots of F. Thus, any arbitrary data sequence x input at the transmitter is received undistorted at the receiver. The difficulty is that CIR roots lying close to the unit circle in the z-plane are difficult to synthesise.

In a first aspect the invention provides a fixed wireless access (FWA) communication system comprising an access point and a plurality of subscriber units each transmitting a predetermined data sequence: comprising means for determining the impulse response of the upstream channel between each subscriber unit and the access point; means for generating the data for transmission from a subscriber unit to the access point, the data comprising the predetermined data sequence predistorted to compensate for the channel impulse response of the upstream channel between the subscriber unit and the access point; means for storing the predistorted predetermined data sequence within the subscriber unit; and means for transmitting the stored sequence from the subscriber unit to the access point when it is desired to transmit the predetermined sequence to the access point.

In a system according to the invention, the transmitted data word is modified so that when passed through the precoder and over a multipath channel the original data word is received undistorted. The two operations of modifying the data word and precoding are combined into a single operation. In effect, this means that the precoder coefficients are designed specifically for a unique data word to be transmitted. Although this is not very useful for the transmission of random data, it has particular application for the upstream transmission of a contention word from a subscriber unit to an access point. In this case, each subscriber unit transmits a single unique contention word that is specific to the subscriber unit and does not change. This means that it is feasible to design a precoder which is specifically optimised for the contention word used by each subscriber unit.

The means for determining the impulse response of the upstream channel may comprise means for transmitting a training data sequence having good autocorrelation properties from the subscriber unit to the access point, the training data sequence being known to the access point and means for deriving the channel impulse response from the received data sequence. All subscriber units may transmit the same training data sequence.

The access point may be arranged to transmit the respective upstream channel impulse response and a unique contention word to each subscriber unit, the contention word being the predetermined data sequence, the means for generating the predistorted contention word being located within the subscriber unit.

Alternatively, the access point may be arranged to allocate a unique contention word to the subscriber unit; to calculate a predistorted contention word from the upstream channel impulse response, the predetermined contention word being such that when it is transmitted from the subscriber unit the access point is capable of decoding it without using equalisation; and to transmit to the subscriber unit the predistorted unique contention word.

The subscriber unit may comprise an equaliser for equalising the downstream channel between the access point and the subscriber unit: and the determining means may comprise means for transmitting a training data sequence having good autocorrelation properties from the subscriber unit to the access point; means for retransmitting the received training data sequence from the access point to the subscriber unit; and means within the subscriber unit for deriving the upstream channel impulse response from the received retransmitted training data sequence.

The means for generating the data sequence for transmission from the subscriber unit to the access point may comprise a processor for calculating the predistorted predetermined data sequence from the upstream channel response and the predetermined data sequence using the Moore-Penrose pseudo-inverse algorithm, or a singular-value decomposition (SVD) algorithm.

The invention further provides a subscriber unit for use in such a fixed wireless access system: the subscriber unit comprising means for transmitting a training sequence having good autocorrelation properties over an upstream channel to the access point; means for storing in predistorted form a unique contention word received from the access point, the predistorted form being such as to compensate for the impulse response of the upstream channel; and means for transmitting the predistorted contention word to the access point in order to request access to a transmission channel.

The subscriber unit may be arranged to receive the contention word from the access point over the downstream channel together with the upstream channel impulse response calculated at the access point from the training sequence transmitted from the subscriber unit: the subscriber unit comprising means for calculating a predistorted contention word from the received contention word and channel impulse response, the predistorted contention word being such as to compensate for the impulse response of the upstream channel so that the access point receives the contention word in a form which it can decode without using-equalisation; and means for storing the calculated predistorted contention word in memory.

In an alternative embodiment, the subscriber unit may be arranged to receive a unique contention word and the training sequence retransmitted by the access point in the form received by the access point. In this case the subscriber unit may comprise means for determining the upstream channel impulse response from the received retransmitted training sequence; means for calculating a predistorted contention word using the unique contention word and the determined upstream channel impulse response such that on retransmission of the predistorted contention word over the upstream channel the access point is able to decode the contention word without the use of equalisation; and the means for storing the calculated predistorted contention word in memory.

The invention still further provides an access point for use in a fixed wireless access system, the access point comprising means for receiving a training data sequence having good autocorrelation properties from a subscriber unit; means for allocating the subscriber unit a unique contention word; means for calculating the upstream channel impulse response between the subscriber unit and the access point from the received training data sequence; means for generating a predistorted contention word from the calculated upstream channel impulse response and the allocated contention word; and means for transmitting the predistorted contention word to the subscriber unit.

The generating means may comprise a processor for generating the predistorted contention word from the upstream channel impulse response and the contention word using the Moore-Penrose pseudo-inverse algorithm, or a singular-value decomposition (SVD) algorithm.

Alternatively, an access point for use in the fixed wireless access system may comprise means for receiving a training data sequence having good autocorrelation properties from a subscriber unit; means for allocating the subscriber unit a unique contention word and means for transmitting the received training data sequence together with the unique contention word.

In a further aspect, the invention provides a method of transmitting a predetermined data sequence from a transmitter in a subscriber unit to a receiver in an access point in a fixed wireless access system over a transmission channel having a channel impulse response comprising the steps of:

a) determining the channel impulse response
b) predistorting the predetermined data sequence using the determined channel impulse response so that, when transmitted over the channel and received at the receiver it can be decoded without the use of equalisation; and
c) storing the predistorted data sequence in memory in the subscriber unit.

Our co-pending UK Patent Application No. 0118288.0 (43199) discloses a method of pre-distorting a predetermined data sequence to compensate for the impulse response of a channel over which the predetermined data sequence is to be transmitted comprising the steps of;

transmitting the predetermined data sequence without pre-coding over the channel using a first transmitter, receiving the predetermined data sequence using a first receiver and equalising the received signal, using an algorithm that is constrained to optimise the equaliser specifically for the predetermined sequence, to enable the data sequence to be decoded;

determining the equaliser coefficients required to enable the equaliser to equalise the received data sequence, applying the determined equaliser coefficients to a second transmitter;

transmitting the equaliser coefficients to a second receiver using the second transmitter, receiving the equaliser coefficients at the second receiver, and loading the received equaliser coefficients into a precoder in the first transmitter when the predetermined sequence is subsequently transmitted so that it is received at the first receiver in a form suitable for decoding without equalisation at the first receiver.

Our co-pending UK Application No. 0201738.2 (43653) discloses a method of pre-distorting a predetermined data sequence to compensate for the impulse response of a channel over which the predetermined data sequence is to be transmitted comprising the steps of;

transmitting the predetermined data sequence without pre-ceding over the channel using a first transmitter, receiving the predetermined data sequence using a first receiver and equalising the received signal, using an algorithm that is constrained to optimise the equaliser specifically for the predetermined sequence, to enable the data sequence to be decoded;

determining the equaliser coefficients required to enable the equaliser to equalise the received data sequence, applying the determined equaliser coefficients to a second transmitter;

transmitting the equaliser coefficients to a second receiver using the second transmitter;

receiving the equaliser coefficients at the second receiver;

forming the predistorted predetermined data sequence and storing it in memory; and subsequently transmitting the stored predistorted predetermined data sequence so that it is received at the first receiver in a form suitable for decoding without equalisation at the first receiver.

In both of the above referenced applications it is necessary for the predetermined data sequence to be transmitted without preceding to determine the upstream channel impulse response. In contrast, in the present invention it is not necessary to transmit the predetermined data sequence, rather any data sequence having good autocorrelation properties may be used provided that sequence is known to the access point. In particular the same sequence may be used by all subscriber units enabling a simplification of the access point in that it does not need to allocate a sequence to the subscriber unit in order to enable the upstream channel impulse response to be determined.

Step a) may comprise the steps of:
d) transmitting a training sequence from the subscriber unit to the access point; and
e) calculating the channel impulse response from the received training data sequence.

Step e) may be carried out at the access point and comprise the further steps of:
f) transmitting the calculated channel impulse response from the access point to the subscriber unit; and
g) transmitting the predetermined data sequence from the access point to the subscriber unit.

Steps b) and e) may be carried out in the access point and comprise the further step of transmitting the predistorted predetermined data sequence from the access point to the subscriber unit.

This enables a reduction in complexity of the subscriber units since the generation of the predistorted contention word takes place in the access point. It will be apparent that in many systems there will be significantly more subscriber units than access points and consequently reducing the complexity, and hence the cost, of the subscriber units can result in a lower system cost.

The method may comprise the step of retransmitting the training data sequence from the access point to the subscriber unit wherein step e) is carried out at the subscriber unit.

Step b) may be carried out by generating the predistorted predetermined data sequence from the predetermined data sequence and the channel impulse response using the Moore-Penrose pseudo-inverse algorithm, or a singular-value decomposition (SVD) algorithm.

The above and other features and advantages of the invention will be apparent from the following description, by way of example, of embodiments of the present invention with reference to the accompanying drawings, in which:—

Figure 1:
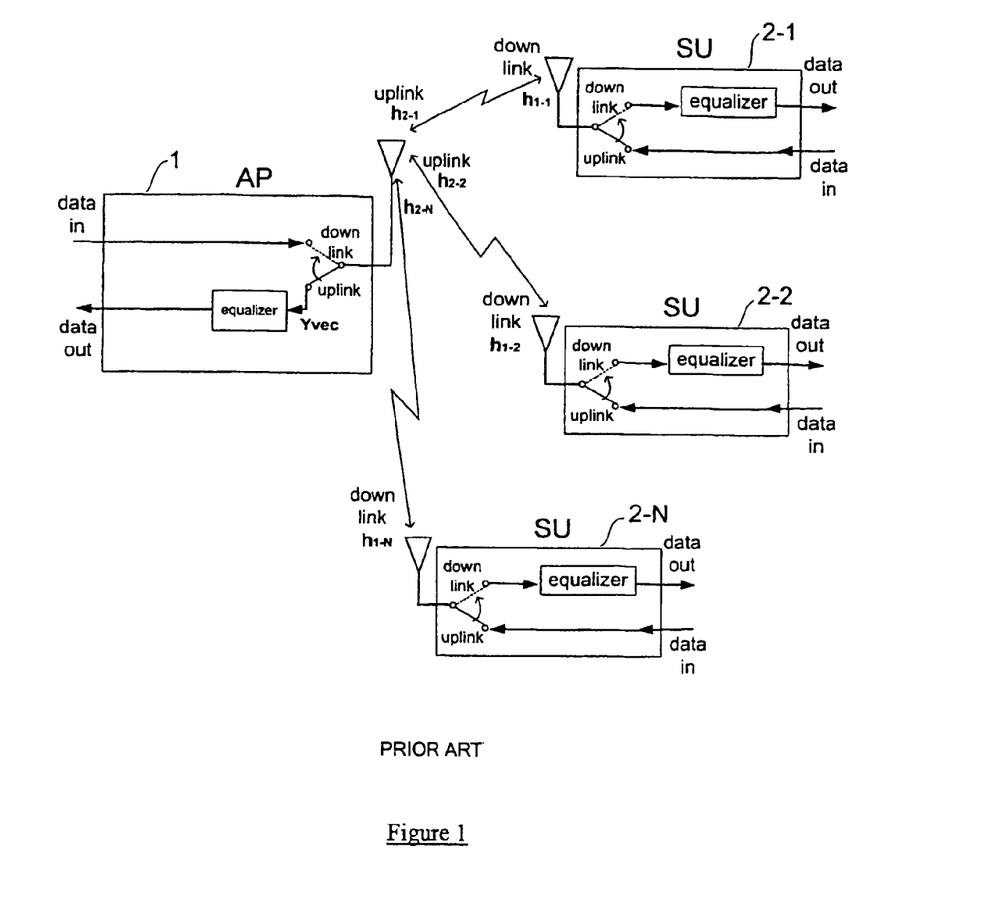
FIG. 1 shows, in block schematic form, a generalised fixed wireless access communication system of known form.

As shown in FIG. 1 a known fixed wireless access communications network comprises an access point 1 and a plurality of subscriber units 2-1, 2-2 to 2-N. Each subscriber unit is connected to the access point via a downstream channel $h_{1-1}$, $h_{1-2}$ and $h_{1-N}$ and upstream channels $h_{2-1}$, $h_{2-2}$ to $h_{2-N}$. As discussed in the introduction, each of these channels will suffer multipath interference and each of the channels will have its own channel impulse response. Normally the subscriber units will be able to hear all downstream transmissions from the access point and consequently will have plenty of time to train an equaliser to remove intersymbol interference. In the upstream direction, however, each subscriber unit transmits to the access point over a separate channel using a time division multiplex protocol. As a result, the characteristics of the equaliser at the access point 1 have to be changed for each transmission from the subscriber units since the channel impulse responses for the transmissions from different subscriber units will be different. During normal data transmission this may be achieved by switching equaliser coefficients stored in a look up table depending on which subscriber unit has been allocated the particular upstream transmission time slot. That is the access point knows which subscriber unit is transmitting at any particular time and can preset its equaliser characteristics using a look up table storing the appropriate tap co-efficients, which have been determined using training sequences on previous transmissions to equalise the particular channel impulse response in the channel between the expected subscriber unit and the access point. During a contention slot, however, the access point has no knowledge of which subscriber unit is attempting to communicate with it. Thus, the equaliser has to be trained for every transmission as it has no prior knowledge of which transmission channel is being used and hence what its characteristics are. This imposes a large overhead as the subscriber unit has to transmit a training sequence within the contention slot in order to enable the access point to train its equaliser.

As has been stated earlier, it is known that a precoder can be used to invert the channel impulse response before transmission. These precoders use some kind of filter or combination of filters to invert the channel impulse response so that any transmitted signal, after precoding and passing through the channel, is received undistorted at the receiver. The precoder transfer function F is the inverse of the channel transfer function H, so that FH=1. Thus any arbitrary data sequence input at the transmitter is received undistorted at the receiver. This holds true for all input sequences.

In our co-pending UK Patent Application No: 0106604.2 (42559) a linear precoder is used to avoid the stability problems associated with non-linear precoders. The linear precoder cancels all roots of the channel impulse response except for those roots lying on the unit circle in the z plane. A root rotation method combined with pulse position modulation is used to remove critical zeros (zeros on the unit circle) from the channel impulse response. In effect, the input data word is modified to cancel out those zeros of the channel impulse response which the precoder is unable to cancel. The difficulty with this method is that some channels contain multiple critical zeros which are beyond the capacity of the root rotation method to remove.

It is desirable to use pre-equalisation (preceding) for the contention word as proposed in our co-pending application, but a more robust method is desirable to deal with the situation where multiple critical zeros of the channel impulse response lie on or close to the unit circle in the z plane.

Figure 2:
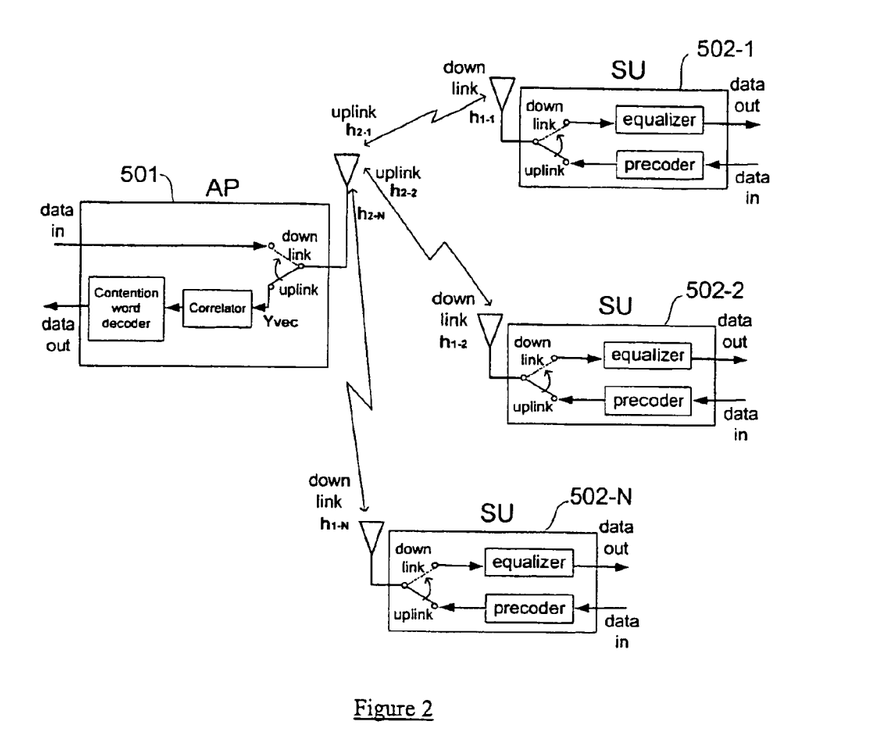
FIG. 2 shows, in block schematic form, a fixed wireless access system according to the invention.

FIG. 2 shows in block schematic form a fixed wireless access system in which the invention may be implemented. The system shown in FIG. 2 comprises an access point 501 and a plurality of subscriber units 502-1, 502-2 to 502-N. Transmission between the access point 501 and the subscriber units 502 is by means of a time division multiplex, frequency division duplex protocol. That is, the access point transmits data to the subscriber units at one carrier frequency and receives transmissions from each subscriber unit using a different carrier frequency, the subscriber units all transmitting at the same carrier frequency, but in time division multiplex form. As a result, all the subscriber units receive downstream data from the access point on the same carrier frequency, albeit over different channels. That is, the downstream channels $h_{1-1}$, $h_{1-2}$ to $h_{1-N}$ will have different channel impulse responses but will continuously receive the transmissions from the access point even if they are not specifically addressed to that subscriber unit. The access point 501 will receive transmissions from the subscriber units over upstream channels $h_{2-1}$, $h_{2-2}$ to $h_{2-N}$. Each of these channels will have a different channel impulse response and the transmissions will be time division multiplexed so that the access point receives bursts of data from each of the subscriber units in turn. Due to the different carrier frequencies used for upstream and downstream transmission, the downstream channel impulse responses $h_{1-1}$ to $h_{1-N}$ are not the same as the corresponding upstream channel responses $h_{2-1}$ to $h_{2-N}$.

Data sent by the access point is not precoded as all the subscriber units have sufficient time to equalise the channel characteristics between the access point and the respective subscriber unit, since they will normally receive all transmissions from the access point and the access point is transmitting relatively continuously. Thus each subscriber unit will include an equalizer to remove intersymbol interference from the transmissions of the access point and this equalizer has ample time to be trained to the channel characteristics. In the upstream direction, transmissions from the subscriber unit are precoded before being transmitted to compensate for the impulse response of the channel between the subscriber unit and the access point. This is because the access point would otherwise incur a substantial signal processing burden in equalising the channels from all the different subscriber units. This signal processing would have to be done in a short time period otherwise the transmission overheads would become excessive.

Figure 3:
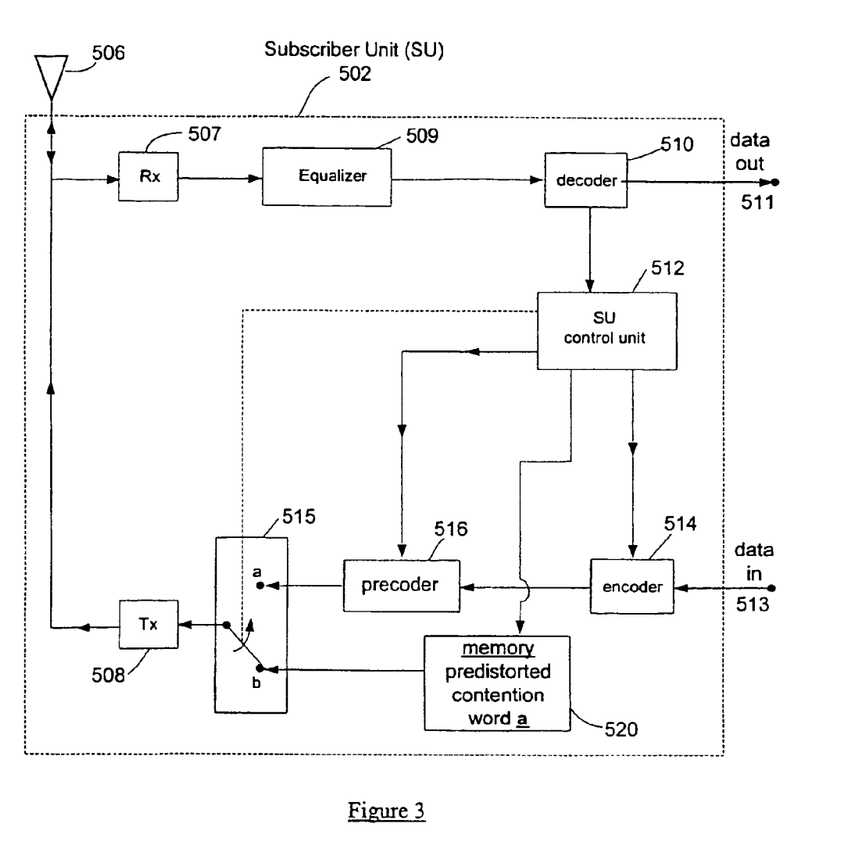
FIG. 3 shows, in block schematic form, an embodiment of a subscriber unit according to the invention for use in the system of FIG. 2.

FIG. 3 shows in block schematic form an embodiment of a subscriber unit 502 in which the invention may be implemented. The subscriber unit 502 is connected to an antenna 506 via which communication with the access point 501 is effected. Data transmitted from the access point 501 is passed via the aerial 506 to the input of a receiver 507. The output of the receiver 507 is fed to the input of an equaliser 509 whose output is connected to the input of a decoder 510. The output of the decoder 510 provides a data output 511 of the subscriber unit 502. The output of the decoder is also fed to an input of a control unit 512 which controls the operation of the subscriber unit 502. The control unit 512 will typically comprise a processor with associated data and programme memory. A data input 513 is connected to the input of an encoder 514 which encodes the data to be transmitted to the access point 501 and assembles it into appropriate data frames under the control of the control unit 512. The output of the encoder 514 is fed to the input of a precoder 516 which precodes the data to compensate for the impulse response of the upstream channel to the access point 501. The precoder 516 is controlled by the control unit 512 to enable it to precode the data in such a manner as to at least partially compensate for the impulse response of the upstream data channel. It should be noted that the precoder 516 is used for general data transmission and may only partially precode the data so that some equalisation may be necessary at the access point for general data. The precoder 516 is not used when transmitting the contention word. That is a predetermined data sequence that can, according to the present invention, be sufficiently precoded at the subscriber unit to enable decoding at the access point without the use of any equalisation at the access point. The output of the precoder 516 is fed to a first input of a switching arrangement 515 whose output is connected to the input of a transmitter 508. The output of the transmitter is connected to the antenna 506 to enable the data to be transmitted from the subscriber unit 502 to the access point 501.

The subscriber unit further comprises a memory 520 in which the predistorted contention word is stored. The contention word is used by the subscriber unit to request allocation of a transmission channel to enable the subscriber unit to transmit data to the access point. The control unit 512 loads a predistorted contention word into the memory 520. The predistorted contention word is calculated using the contention word allocated to the subscriber unit and the upstream channel impulse response.

When the subscriber unit wishes to request access to a transmission channel the control unit 512 causes this predistorted contention word to be read from the memory and applied to a second input of the switching arrangement 515. The output of the memory 520 is fed to a second input of the switching arrangement 515 and the control unit will control the switching arrangement 515 such that the second input from the memory 520 is passed to its output to be applied to the input of transmitter 508 during a contention slot when the subscriber unit wishes to request a transmission channel.

Figure 4:
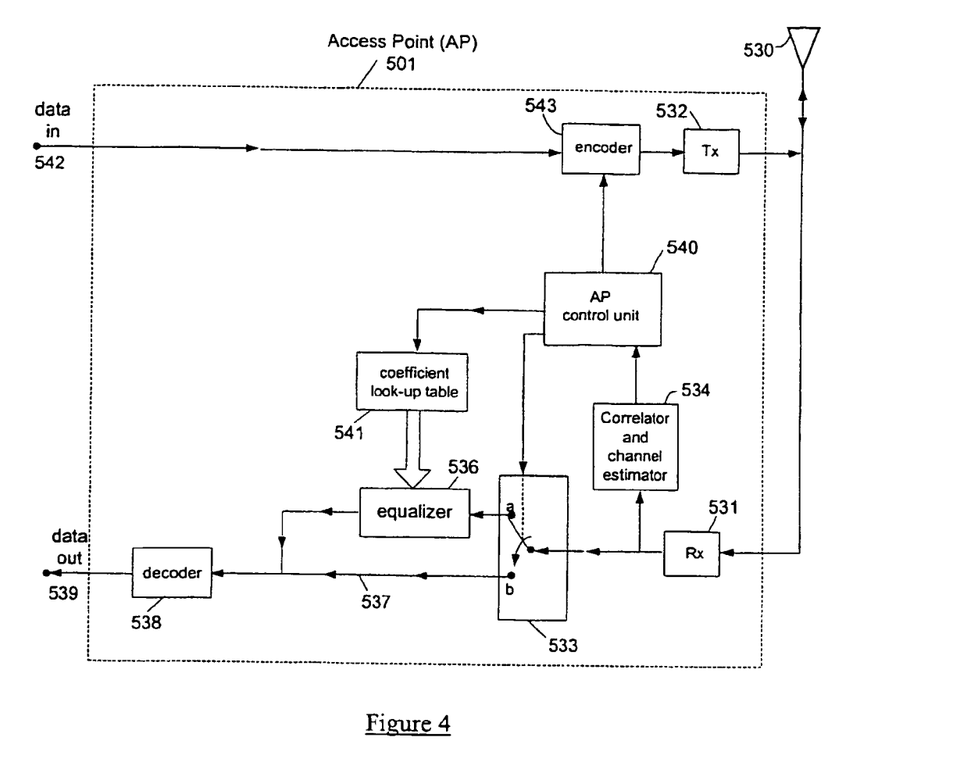
FIG. 4 shows, in block schematic form, an embodiment of an access point according to the invention for use in the system of FIG. 2.

FIG. 4 shows, in block schematic form, an embodiment of an access point 501 in which the invention may be implemented. An antenna 530 is coupled to the access point 501 and is connected to the input of a receiver 531. The output of the receiver 531 is connected via a switching arrangement 533 having a first output coupled to the input of an equaliser 536, which may take the form of a decision feedback equaliser, and a second output coupled to a bypass line 537. The output of the receiver 531 is further connected to an input of a correlator and channel estimator 534 that establishes correct timing and provides timing information and channel estimation to a control unit 540. The control unit 540 will, typically, comprise a microprocessor and associated programme and data memory. The output of the equaliser 536 and bypass line 537 are connected to the input of a decoder 538. The output of the decoder 538 is fed to a data output 539 of the access point 501 and to an input of the control unit 540. The control unit 540 has an output which controls the switching arrangement 533 to select whether the bypass line 537 or equaliser 536 are used in the decoding of the data sent from the subscriber units. The control unit 540 also enters data into a look-up table 541, which may take the form of a read-write memory, and controls the reading out of the data into the equaliser 536 to enable the appropriate equaliser taps to be set depending on which subscriber unit is transmitting to the access point at the time. An input 542 receives data for transmission and is connected to the input of an encoder 543 whose output is fed to the input of a transmitter 532. The encoder 543 is controlled by an output from the control unit 540 which causes the data to be encoded and assembled into the appropriate frame structure.

Figure 5:
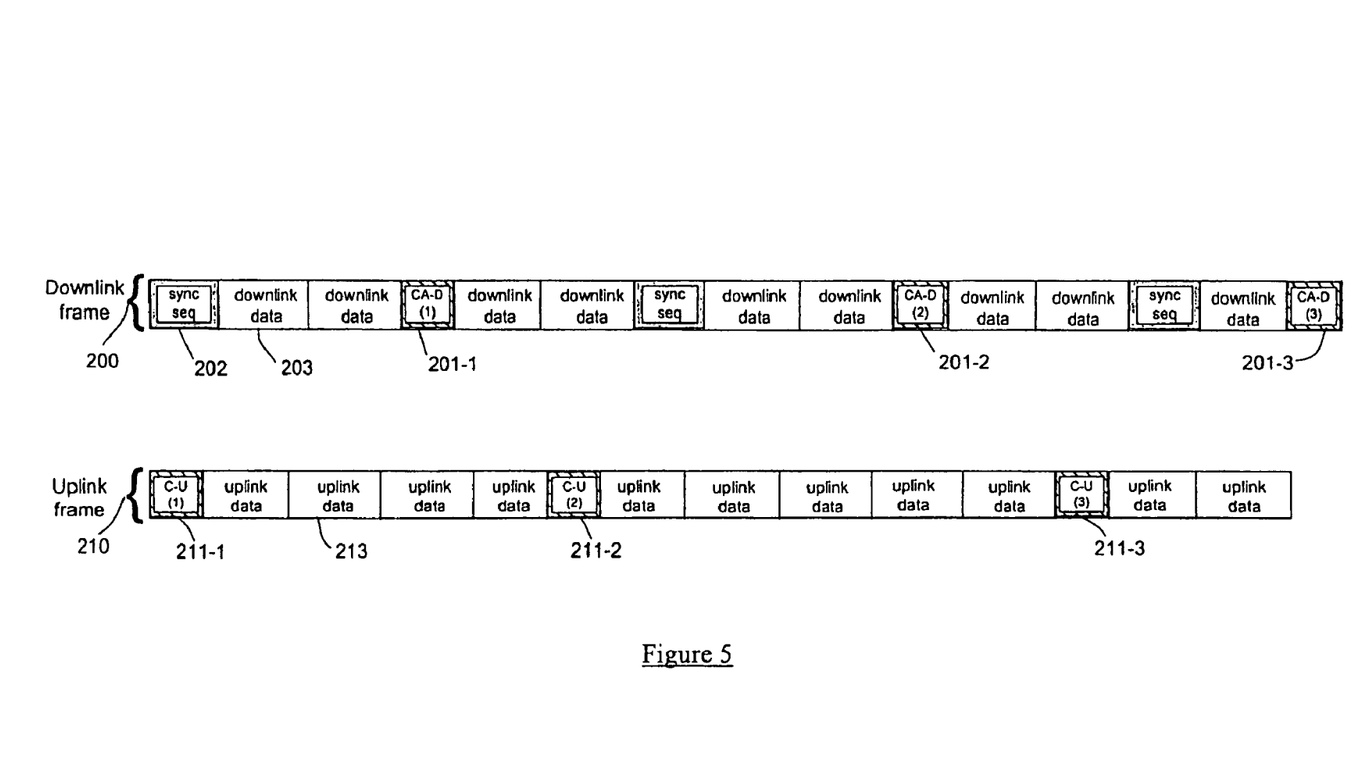
FIG. 5 shows upstream and downstream frames and shows, in particular, the contention word slots.

FIG. 5 shows downstream (access point to subscriber unit) and upstream (subscriber unit to access point) transmission frames. The downstream frames 200 comprise an initial synchronisation sequence 202 and data fields 203. Contention allocation data fields 201-1 to 201-3 are also transmitted to identify to individual subscriber units when they are allocated data slots to transmit data to the access point over the upstream channels. Clearly the number of contention allocation data fields in a frame may be greater or less than three.

The upstream frames 210 contains contention slots 211-1 to 211-3 during which a subscriber unit can transmit a contention word to the access point in order to request transmission time. The upstream frame also includes data fields 213 that are allocated by the access point to particular subscriber units to transmit general data to the access point on the basis of contention requests made by the subscriber units.

It will be apparent to the skilled person that during the data fields 213 the access point will know which subscriber unit is transmitting since the access point allocated individual data fields 213 to selected subscriber units. As a result, the access point has a knowledge of the channel impulse response and can use an equaliser having stored preset characteristics to aid in decoding the data. During the contention slots 211-1 to 211-3, however, the access point does not know the channel characteristic, since it does not know until it has decoded the contention word which subscriber unit is transmitting. Accordingly, in a system according to the invention the contention word is fully precoded so that equalisation is not needed to decode the contention word at the access point but the general data may be only partially precoded with some equalisation taking place at the access point since, for general data, the access point has some knowledge of the upstream channel impulse response.

Figure 6:
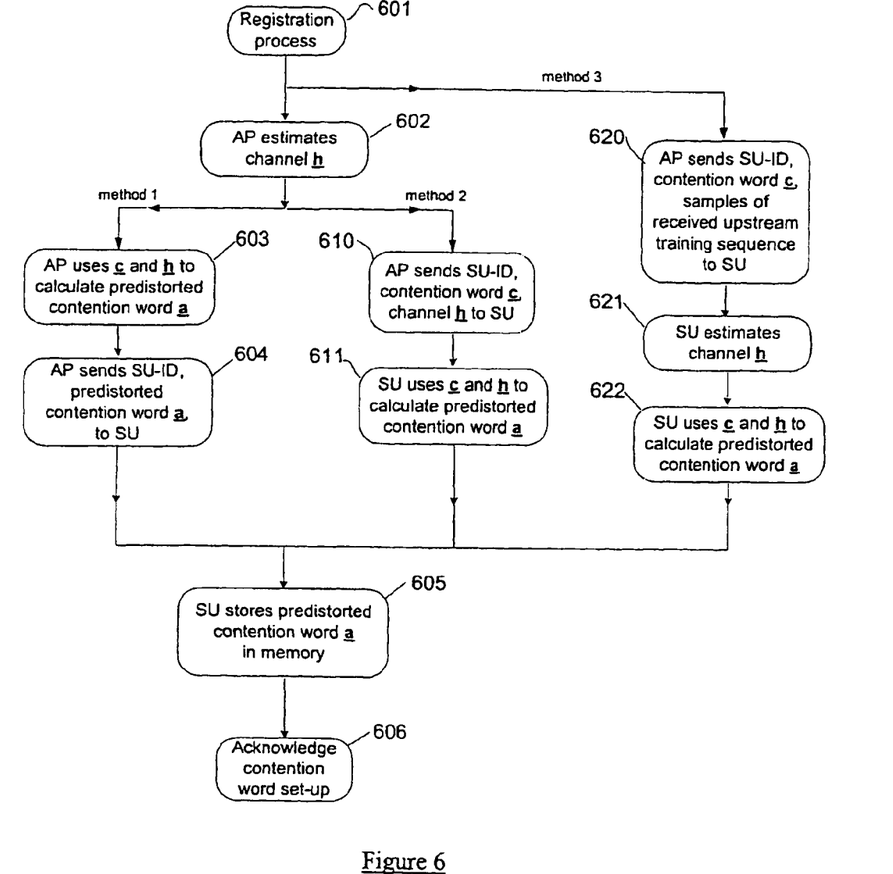
FIG. 6 is a flow diagram illustrating methods of setting up the contention word for a subscriber unit.

FIG. 6 is a flow-diagram showing how the contention word is set up in a system as shown in FIG. 2. The first stages of the registration process, block 601, may follow the procedure described in our co-pending UK patent applications numbers 0113887.4 (42557) and 0113888.2 (43066) or other techniques known in the art. In order for a subscriber unit to request upstream transmission time, it must first contend for channel access using a contention slot. The final stage of the subscriber unit registration involves setting up the contention process for that particular subscriber unit as illustrated in the flow diagram of FIG. 6. After the first registration steps of power control initialisation and down stream equaliser setting as, for example, shown in the two patent applications referenced above, the access point transmits a unique subscriber unit identifier SU-ID to the subscriber unit to be used to identify that subscriber unit in all future communications. In our co-pending UK patent application number 0113888.2 (43066) a procedure is disclosed in which the contention word is calculated by using a test contention word sent from the subscriber unit to the access point, the test contention word having been previously allocated to the subscriber unit by the access point. In a system according to the present invention, an estimate of the uplink channel is required rather than a test contention word sent from the subscriber unit. In the case of a time division duplex system the subscriber unit may simply make a channel estimate based on downstream transmission from the access point. In the case of a frequency division duplex system, however, in which the upstream and downstream channels cannot be assumed to be identical the access point must make a channel estimate based on the data received from the subscriber unit. This is based on a known training sequence sent without precoding by the subscriber unit in a similar way to the test contention word in UK patent application number 0113888.2 (42066). This training sequence need not, however, in this case be the same as the contention word. It may simply be any data sequence with good autocorrelation properties that is known to both the subscriber unit and the access point.

FIG. 6 illustrates three possible methods of generating a predistorted contention word. In the first method the first step is to estimate the upstream channel impulse response, illustrated by box 602. A method by which this channel estimation may be achieved will be explained later. Having estimated the upstream channel impulse response the access point 501 uses the upstream channel impulse response and the contention word that it is allocating to the particular subscriber unit 502 to calculate a predistorted contention word. This is illustrated in step 603. Having calculated the predistorted contention word the access point 501 sends a subscriber unit identifier to the subscriber unit 502 together with the predistorted contention word, illustrated by step 604. When the subscriber unit 502 receives the predistorted contention word from the access point 501 it stores the received predistorted contention word in the memory 520. This is illustrated in step 605. The subscriber unit 502 identifies that the predistorted contention word is allocated to itself by means of the associated subscriber unit identifier. The final step 606 is to acknowledge that the contention word has been received and that the contention is now set up.

In a second method the access point 501 again estimates the upstream channel impulse response in step 602, but then the access point in step 610 sends the subscriber unit identifier, the contention word, and the channel impulse response to the subscriber unit. Then, in step 611, the subscriber unit uses the contention word and upstream channel impulse response to calculate a predistorted contention word. The subscriber unit then follows the procedure of the first method and stores the predistorted contention word in the memory 520.

In the third method the access point 501, instead of estimating the upstream channel impulse response, retransmits samples of the training sequence that it received to the subscriber unit 502 together with the subscriber unit identifier and the contention word that the access point 501 has allocated to that particular subscriber unit 502. This is illustrated in step 620. Step 621 is the subscriber unit estimating the upstream channel impulse response from the retransmitted samples of the received training sequence. The next step 622 is for the subscriber unit to calculate the upstream channel impulse response from the training sequence that has been retransmitted by the access point and to predistort the contention word the access point has allocated to it. The third method then enters step 605 and the predistorted contention word is now stored in the memory 520 and the contention word set up acknowledged in step 606 in the same manner as the first and second methods.

In order to calculate the predistorted contention word the uplink channel $h=[h_1, h_2 \ldots h_L]^T$ is first calculated. This is step 602 in the first and second methods and step 621 in the third method. One method is to use least-squares in the form of the Moore-Penrose pseudo-inverse (MPPI) algorithm to solve the equation: $Xh=y$ where y is the sequence of received training sequence samples after transmission over the channel, and X is a matrix constructed from the known training sequence as follows:

$$X = \begin{bmatrix} x_N & x_{N-1} & \ldots & x_1 \\ x_{N+1} & x_N & \ldots & x_2 \\ \vdots & \vdots & & \vdots \\ x_{2N-1} & x_{2N-2} & \ldots & x_N \end{bmatrix}$$

The MPPI algorithm may be used to calculate h as: $h = X^{-\#} y$ where: $X^{-\#} = (X^{*T} X)^{-1} X^{*T}$ The channel estimate h may also be obtained using recursive algorithms such as RLS or LMS, or else simply using a correlator acting on samples of the received training sequence. However, the least-squares solution calculated using the MPPI equation, is the presently preferred method.

Once the uplink channel estimate h has been obtained, the MPPI algorithm is used to solve for the best predistorted sequence a to transmit at the subscriber unit in order to receive the undistorted contention word c at the access point. This is step 603 in the first method, step 611 in the second method, and step 622 in the third method. This predistorted (precoded) contention word a, which when passed through the channel produces the original contention word c at the receiver, is calculated in the following manner:

$$c = Ha \quad (1)$$

where $c = [c_1, c_2, \ldots, C_K]^T =$ the original contention word

H is the upper triangular channel matrix, of dimension K×N:

$$H = \begin{bmatrix} h_L & h_{L-1} & \ldots & h_1 & 0 & 0 & \ldots & 0 \\ 0 & h_L & \ldots & h_2 & h_1 & 0 & \ldots & 0 \\ \vdots & \vdots & & \vdots & \vdots & \vdots & & \vdots \\ 0 & 0 & \ldots & 0 & 0 & h_L & \ldots & h_1 \end{bmatrix}$$

A cyclic prefix at least as long as the CIR is added to α to form a of length N=(M+L):

$$a = [a_{M-L+1}, a_{M-L+2}, \ldots, a_M, a_1, a_2, \ldots a_M]^T \quad (2)$$

L<K<M

Equation (1) can be re-written in terms of a instead of a:

$$c = \Omega \alpha \quad (3)$$

where:

$$\Omega = \begin{bmatrix} h_1 & 0 & \ldots & 0 & 0 & h_L & h_{L-1} & \ldots & h_3 & h_2 \\ h_2 & h_1 & \ldots & 0 & 0 & 0 & h_L & \ldots & h_4 & h_3 \\ \vdots & \vdots & & \vdots & \vdots & \vdots & \vdots & & \vdots & \vdots \\ 0 & 0 & \ldots & h_L & h_{L-1} & h_{L-2} & h_{L-3} & \ldots & h_1 & 0 \\ 0 & 0 & \ldots & 0 & h_L & h_{L-1} & h_{L-2} & \ldots & h_2 & h_1 \end{bmatrix}$$

$$\alpha = \Omega^{-\#} c = (\Omega^{*T} \Omega)^{-1} \Omega^{*T} c$$

where $\Omega^{-\#}$ is the Moore-Penrose pseudo-inverse (MPPI) of $\Omega$. The kernel of the precoded contention word α is then cyclically extended to form the full precoded contention word a before transmission in an access request timeslot.

Since $\Omega$ is a circulant matrix, an alternative method (which offers better numerical properties) for calculating α is to use singular-value decomposition (SVD) as follows:

$$\Omega = Q_1 \Lambda Q_2^{*T}$$

(singular value decomposition of $\Omega$), and so the pseudo-inverse is calculated as:

$$\Omega^{-\#} = Q_2 \Lambda^{-\#} Q_1^{*T}$$

The matrices $Q_1$ and $Q_2$ are unitary matrices, and $\Lambda$ is a diagonal matrix as follows: $\Lambda = \text{diag}[\lambda_1, \ldots, \lambda_N]$ and its inverse is: $\Lambda^{-\#} = \text{diag}[\lambda_1^{-1}, \ldots, \lambda_N^{-1}]$.

Figure 7:
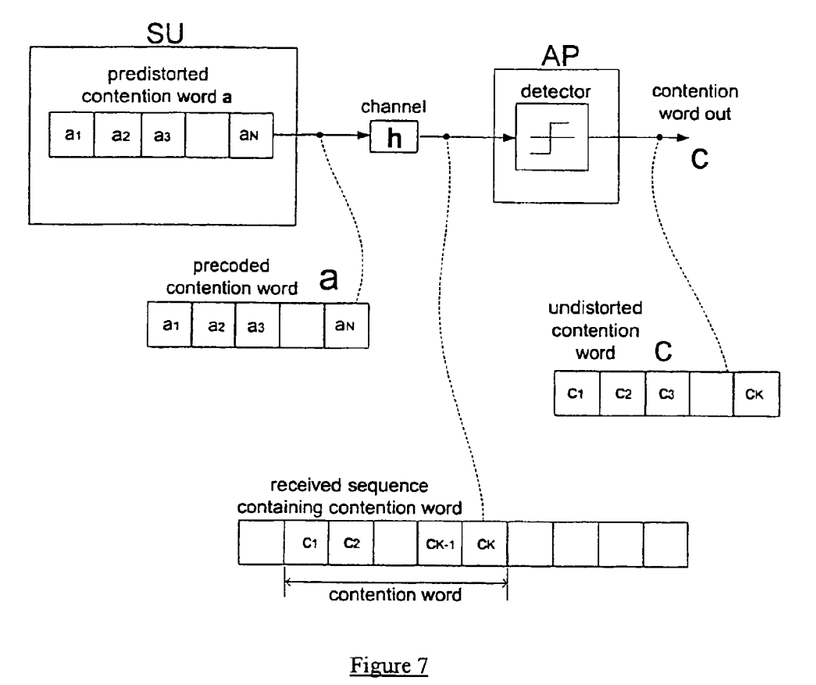
FIG. 7 illustrates the form of the contention word at various points in its transmission from the subscriber unit to the access point.

FIG. 7 shows the form of the contention word a as transmitted by the subscriber unit SU and applied to the upstream channel h, the received sequence at the access point AP after transmission through the upstream channel h, and the decoded contention word c at the output of the access point AP.

Figure 8:
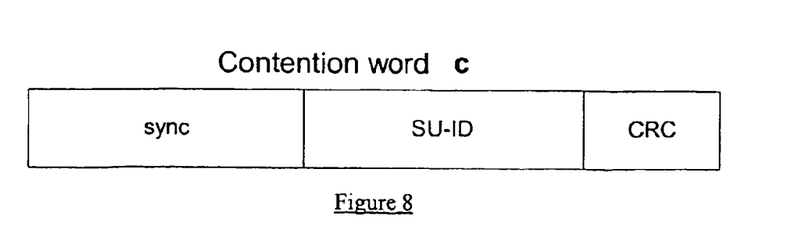
FIG. 8 illustrates a form of contention word.

FIG. 8 shows the form of the contention word used in the present embodiment. It comprises a synchronisation field sync, a unique identifier SU-ID for the particular subscriber unit, and a cyclic redundancy code CRC for error detection and/or correction. Clearly, the form of the contention word could be different from that shown in FIG. 8, which is merely an example of a suitable contention word and many more other forms would be apparent to the skilled person.

The invention claimed is:

1. A fixed wireless access (FWA) communications system comprising an access point and a plurality of subscriber units each transmitting a predetermined data sequence: comprising means for determining the impulse response of the upstream channel between each subscriber unit and the access point; means for generating a data sequence for transmission from a subscriber unit to the access point, the data comprising the predetermined data sequence pre-distorted to compensate for the channel impulse response of the upstream channel between the subscriber unit and the access point, means for storing the pre-distorted predetermined data sequence within the subscriber unit, and means for transmitting the stored sequence from the subscriber unit to the access point when it is desired to transmit the predetermined sequence to the access point; wherein the means for generating the data sequence for transmission from the subscriber unit to the access point comprises a processor for calculating the pre-distorted predetermined data sequence from the upstream channel response and the predetermined data sequence using the Moore-Penrose Pseudo-Inverse Algorithm.

2. A system as claimed in claim 1 in which the means for determining the impulse response of the upstream channel comprises means for transmitting a training data sequence having good auto correlation properties from the subscriber unit to the access point, the training data sequence being known to the access point, and means for deriving the channel impulse response from the received data sequence.

3. A system as claimed in claim 2 in which all subscriber units transmit the same training data sequence to enable their respective upstream channel impulse responses to be determined.

4. A system as claimed in claim 1 in which the access point is arranged to transmit the respective upstream channel impulse response and a unique contention word to each subscriber unit, the contention word being the predetermined data sequence, the means for generating the pre-distorted contention word being located within the subscriber unit.

5. A system as claimed in claim 2 in which the access point is arranged to transmit the respective upstream channel impulse response and a unique contention word to each subscriber unit, the contention word being the predetermined data sequence, the means for generating the pre-distorted contention word being located within the subscriber unit.

6. A system as claimed in claim 3 in which the access point is arranged to transmit the respective upstream channel impulse response and a unique contention word to each subscriber unit, the contention word being the predetermined data sequence, the means for generating the pre-distorted contention word being located within the subscriber unit.

7. A system as claimed in claim 1 in which the access point is arranged to allocate a unique contention word to the subscriber unit, to calculate a pre-distorted contention word from the upstream channel impulse response, the pre-distorted contention word being such that when it is transmitted from the subscriber unit the access point is capable of decoding it without using equalisation, and to transmit to the subscriber unit the pre-distorted unique contention word.

8. A system as claimed in claim 2 in which the access point is arranged to allocate a unique contention word to the subscriber unit, to calculate a pre-distorted contention word from the upstream channel impulse response, the pre-distorted contention word being such that when it is transmitted from the subscriber unit the access point is capable of decoding it without using equalisation, and to transmit to the subscriber unit the pre-distorted unique contention word.

9. A system as claimed in claim 3 in which the access point is arranged to allocate a unique contention word to the subscriber unit, to calculate a pre-distorted contention word from the upstream channel impulse response, the pre-distorted contention word being such that when it is transmitted from the subscriber unit the access point is capable of decoding it without using equalisation, and to transmit to the subscriber unit the pre-distorted unique contention word.

10. A system as claimed in claim 1 in which the subscriber unit comprises an equaliser for equalising the downstream channel between the access point and the subscriber unit, and the determining means comprises means for transmitting a training data sequence having good auto correlation properties from the subscriber unit to the access point, means for re-transmitting the received training data sequence from the access point to the subscriber unit, and means within the subscriber unit for deriving the upstream channel impulse response from the received re-transmitted training data sequence.

11. A system as claimed in claim 10 in which the predetermined data sequence is a contention word which is unique to each subscriber unit in the system.

12. A subscriber unit for use in a fixed wireless access system as claimed in claim 1: the subscriber unit comprising means for transmitting a training sequence having good auto correlation properties over an upstream channel to the access point; means for storing, in pre-distorted form, a unique contention word received from the access point, the pre-distorted form being such as to compensate for the impulse response of the upstream channel; and means for transmitting the pre-distorted contention word to the access point in order to request access to a transmission channel.

13. A subscriber unit as claimed in claim 2 arranged to receive the pre-distorted contention word from the access point over the downstream channel.

14. A subscriber unit as claimed in claim 12 arranged to receive the contention word from the access point over the downstream channel together with the upstream channel impulse response calculated at the access point from the training sequence transmitted by the subscriber unit, wherein the subscriber unit comprises means for calculating a pre-distorted contention word from the received contention word and channel impulse response, the pre-distorted contention word being such as to compensate for the impulse response of the upstream channel so that the access point receives the contention word in a form which it can decode without using equalisation, and means for storing the calculated pre-distorted contention word in memory.

15. A subscriber unit as claimed in claim 14 in which the calculating means comprises a processor for calculating the upstream channel response from the received re-transmitted training data sequence.

16. A subscriber unit as claimed in claim 12 arranged to receive a unique contention word and the training sequence re-transmitted by the access point in the form received by the access point: the subscriber unit comprising means for determining the upstream channel impulse response from the received re-transmitted training sequence; means for calculating a pre-distorted contention word using the unique contention word and the determined upstream channel impulse response such that on transmission of the pre-distorted contention word over the upstream channel the access point is able to decode the contention word without the use of equalisation; and means for storing the calculated pre-distorted contention word in memory.

17. A subscriber unit as claimed in claim 14 in which the means for calculating the pre-distorted contention word comprises a processor using the Moore-Penrose Pseudo-Inverse Algorithm to calculate the pre-distorted contention word from the upstream channel impulse response and the received contention word.

18. A subscriber unit as claimed in claim 15 in which the means for calculating the pre-distorted contention word comprises a processor using the Moore-Penrose Pseudo-Image Inverse Algorithm to calculate the pre-distorted contention word from the upstream channel impulse response and the received contention word.

19. A subscriber unit as claimed in claim 16 in which the means for calculating the pre-distorted contention word comprises a processor using the Moore-Penrose Pseudo-Inverse Algorithm to calculate the pre-distorted contention word from the upstream channel impulse response and the received contention word.

20. A subscriber unit as claimed in claim 17 in which the means for calculating the pre-distorted contention word comprises a processor using the Moore-Penrose Pseudo-Inverse Algorithm to calculate the pre-distorted contention word from the upstream channel impulse response and the received contention word.

21. An access point for use in a fixed wireless access system as claimed in claim 1: the access point comprising means for receiving a training data sequence having good auto correlation properties from a subscriber unit; means for allocating the subscriber u nit a unique contention word; means for calculating the upstream channel impulse response between the subscriber unit and the access point from the received training data sequence; means for generating a pre-distorted contention word from the calculated upstream channel impulse response and the allocated contention word; and means for transmitting the pre-distorted contention word to the subscriber unit.

22. An access point as claimed in claim 21 in which the generating means comprises a processor for generating the pre-distorted contention word from the upstream channel impulse response and the contention word using the Moore-Penrose Pseudo-Inverse Algorithm.

23. An access point for use in a fixed wireless access system as claimed in claim 1 comprising means for receiving a training data sequence having good auto correlation properties from a subscriber unit; means for allocating the subscriber unit a unique contention word; and means for transmitting the received training data sequence together with the unique contention word.

24. A method of transmitting a predetermined data sequence from a transmitter in a subscriber unit to a receiver in an access point in a fixed wireless access system over a transmission channel having a channel impulse response comprising the steps of:

a) determining the channel impulse response, b) pre-distorting the predetermined data sequence using the determined channel impulse response so that when transmitted over the channel and received at the receiver it can be decoded without the use of equalisation, by generating the pre-distorted predetermined data sequence from the predetermined data sequence and the channel impulse response using the Moore-Penrose Pseudo-Inverse Algorithm, and c) storing the pre-distorted data sequence in memory in the subscriber unit.

25. A method as claimed in claim 24 in which step a) comprises the steps of;

d) transmitting a training data sequence from the subscriber unit to the access point and, e) calculating the channel impulse response from the received training data sequence.

26. A method as claimed in claim 25 in which step e) is carried out at the access point and comprising the further steps of;

f) transmitting the calculated channel impulse response from the access point to the subscriber unit, and g) transmitting the predetermined data sequence from the access point to the subscriber unit.

27. A method as claimed in claim 25 in which steps b) and e) are carried out in the access point and comprising the further step of transmitting the pre-distorted predetermined data sequence from the access point to the subscriber unit.

28. A method as claimed in claim 25 comprising the step of re-transmitting the training data sequence from the access point to the subscriber unit wherein step e) is carried out at the subscriber unit.

\* \* \* \* \*

UNITED STATES PATENT AND TRADEMARK OFFICE
CERTIFICATE OF CORRECTION

PATENT NO. : 7,519,129 B2
APPLICATION NO. : 10/538561
DATED : April 14, 2009
INVENTOR(S) : John David Porter, Stephen David Greaves and Malcolm Paul Sellars It is certified that error appears in the above-identified patent and that said Letters Patent is hereby corrected as shown below:

Title Page, Column 1 (PCT Filed), Line 1.
Delete "Nov. 12. 2002" and replace with --Nov. 19, 2003--

Column 14, Line 2.
In Claim 14, delete "response ," and replace with --response,--

Column 18, Line 33.
In Claim 14, after "Pseudo" delete "Image"

Column 14, Line 53.
In Claim 21, delete "u nit" and replace with --unit--

Signed and Sealed this

First Day of September, 2009

David J. Kappos
*Director of the United States Patent and Trademark Office*